United States Patent Office 3,451,938
Patented June 24, 1969

3,451,938
SOLID ALKALI METAL POLYPHOSPHATE WATER CONDITIONING COMPOSITION CONTAINING HEXACHLOROBENZENE OR 1,2,4,5 - TETRACHLOROBENZENE
Ewald Henry Krusius, South River, N.J., assignor to FMC Corporation, New York, N.Y., a corporation of Delaware
No Drawing. Filed July 11, 1966, Ser. No. 563,974
Int. Cl. C02b 5/04, 3/06
U.S. Cl. 252—181                10 Claims

ABSTRACT OF THE DISCLOSURE

Solid water conditioning compositions having controlled dissolution properties consisting essentially of a polyphosphate and either hexachlorobenzene or 1,2,4,5-tetrachlorobenzene, in an amount sufficient to retard the rate of dissolution of the solid polyphosphate composition.

---

The present invention is directed to improved solid water-conditioning compositions containing polyphosphates.

Water-conditioning agents, and particularly the polyphosphates, have a wide variety of industrial and domestic uses. They have been found to condition water by chelating impurities, by serving as a cleansing agent and water-softening agent preventing growth of crystals on the surfaces of conduits and tanks. They also function to inhibit corrosion of metal surfaces. As a result of the foregoing characteristics, polyphosphates have wide potential for use in industrial water-treating systems generally, in large home water-treating systems and also in such relatively simple systems as home water tanks. All such applications require a small but specified concentration of dissolved polyphosphate in the water. Although certain large-scale installations may warrant complex feeding and control devices to maintain the desired polyphosphate concentration, the economics of many uses permit only the intermittent addition of solid polyphosphate compositions to the water. Solid polyphosphate water-conditioning compositions having controlled rates of dissolution are desired for such purposes.

It is an object of the present invention to provide solid polyphosphate-containing water-conditioning compositions.

It is also an object of this invention to provide polyphosphate-containing water-conditioning compositions which are economically manufactured.

Other objects and advantages of this invention will in part be obvious and will in part appear hereinafter.

The solid water-conditioning compositions of this invention contain a polyphosphate and as a dissolution retardant, hexachlorobenzene or 1,2,4,5-tetrachlorobenzene, in an amount sufficient to provide a controlled rate of dissolution. The amount of the retardant required is dependent upon the service conditions contemplated. Larger concentrations of the retardant increase the time required to dissolve the composition. For most purposes it is contemplated that the compositions will contain between about 5% and 50%, and preferably between 10% and 20%, of the hexachlorobenzene retardant, or between 5% and 60%, and preferably between 15% and 25%, of the 1,2,4,5-tetrachlorobenzene retardant. Equivalent mixtures of the two retardants may be used.

The polyphosphate component of the compositions includes the alkali metal (sodium or potassium) polyphosphates, such as tetrasodium pyrophosphate, pentasodium tripolyphosphate, and the polyphosphate glasses produced by condensing molecules of sodium orthophosphate to form long chain molecules having phosphorus-oxygen-phosphorus bonds. Among these polyphosphate glasses are "Sodaphos" having a chain length of about 6 and a $P_2O_5$ content of 63.8%; "Hexaphos" having a chain length of about 13 and a $P_2O_5$ content of 67.5%; and "Glass H" having a chain length of about 21 and a $P_2O_5$ content of 68.7%. The corresponding potassium salts may be used in place of the foregoing sodium salts which are preferred because of commercial availability in large quantities at low cost.

The solid polyphosphate containing water conditioning compositions may also contain compounding agents such as wetting agents and/or bactericides, e.g., the quaternary ammonium compounds, stain removers such as sodium binoxalate, alkaline materials such as soda ash, caustic soda, sodium orthosilicate, sodium metasilicate, and trisodium orthophosphate, colorants, perfumes, etc. The compounding ingredients are preferably present in an amount up to about 15%.

The compositions may also contain other water-softening agents, such as nitrilotriacetic acid and ethylenediamine tetraacetic acid and salts thereof, in place of a portion of the polyphosphate.

The solid conditions are readily prepared by mixing finely ground components, preferably in the dry state, until a homogeneous mix is prepared, and then extruding, pressing, tableting, etc., to the desired shape and size. Where one or more of the components is not available in the desired state of subdivision, the mixing of the components may be combined with the grinding operation.

The following examples further illustrate the invention. All parts and percentages specified in the application are by weight.

Solid compositions were prepared by hand grinding and mixing the components in a mortar and pestle. The perfume was added just before the end of the mixing operation. Forty gram tablets having a 1¾ inch diameter were prepared in a Carver laboratory press, at 12,000 pounds of pressure on the ram. The tablets were then steamed for 10 seconds. Tablets were tested for use in home toilet tank operation by placing the tablet at the bottom of a toilet tank at the corner the farthest distance from the flush opening and periodically observing until the tablet was consumed. Tablets were also tested for relative dissolving time by means of an accelerated dissolving test. They were placed in a one-half mesh wire cage which was immersed in a transparent-sided Kenmore washer containing 16 gallons of agitated tap water at 70° F. The time required for the tablet to be reduced in size sufficiently to permit escape from the cage is designated as the time required for the tablet to dissolve. The compositions of the tablets in which all components are specified by percent, and the results of the aforedescribed tests are listed in the following table:

|  | Examples | | | | | | | |
| --- | --- | --- | --- | --- | --- | --- | --- | --- |
|  | 1 | 2 | 3 | 4 | 5 | 6 | 7 | 8 |
| Components, percent: | | | | | | | | |
| Polyphosphate | 76 | 77 | 78 | 70 | 72 | 74 | 76 | 78 |
| Hexachlorobenzene | 13.9 | 12.9 | 11.9 | | | | | |
| 1,2,4,5-tetrachlorobenzene | | | | 19.9 | 17.9 | 15.9 | 13.9 | 11.9 |
| Sodium binoxalate | 10 | 10 | 10 | 10 | 10 | 10 | 10 | 10 |
| Perfume | 0.1 | 0.1 | 0.1 | 0.1 | 0.1 | 0.1 | 0.1 | 0.1 |
| Tablet data: | | | | | | | | |
| Thickness (mm.) | 17.2 | 17.2 | 17.1 | 17.3 | 17.3 | 17.3 | 17.4 | 17.4 |
| Disintegration (sec.) | 1,850 | 1,952 | 1,190 | 2,380 | 2,074 | 1,640 | 1,375 | 1,292 |
| Toilet Tank (days) | 8 | 7 | 2 | 8 | 3 | 2½ | 1½ | 1½ |

The tablet data for each example is an average of three tests. The polyphosphate component was the polyphosphate glass "Hexaphos" identified hereinbefore. Similar results are obtained with compositions utilizing the other polyphosphates defined. The sodium binoxalate functions as a stain remover. The perfume masked the relatively mild odor of the retardant.

The solid compositions utilizing hexachlorobenzene or 1,2,4,5-tetrachlorobenzene attain the desired controlled rates of dissolution with relatively low concentrations of the retardant, permitting larger concentrations of the polyphosphate. Homogeneous solid compositions are readily formed by the inexpensive dry mixing technique described hereinbefore.

What is claimed is:

1. Homogeneous solid water conditioning composition having controlled dissolution properties consisting essentially of an alkali metal polyphosphate and at least one compound selected from the group consisting of hexachlorobenzene and 1,2,4,5-tetrachlorobenzene, in an amount sufficient to retard the rate of dissolution of solid polyphosphate composition.

2. The composition of claim 1 wherein the polyphosphate is a long chain polyphosphate glass having a chain length of about 6 to 21 and a $P_2O_5$ content of 63.8% to 68.7%.

3. The composition of claim 2 containing between 5% and 50% of hexachlorobenzene.

4. The composition of claim 3 containing between 10% and 20% of hexachlorobenzene.

5. The composition of claim 4 wherein said polyphosphate is a long chain polyphosphate glass having a chain length of about 13 and a $P_2O_5$ content of 67.5%.

6. The composition of claim 5 containing up to 15% of at least one compounding agent selected from the group consisting of stain remover, perfume, colorant, wetting agent, alkaline material, and bactericide.

7. The composition of claim 2 containing between 5% and 60% of 1,2,4,5-tetrachlorobenzene.

8. The composition of claim 6 containing between 15% and 25% of 1,2,4,5-tetrachlorobenzene.

9. The composition of claim 8 wherein said polyphosphate is a long chain polyphosphate glass having a chain length of about 13 and a $P_2O_5$ content of between 67% and 69%.

10. The composition of claim 9 containing up to 15% of at least one compounding agent selected from the group consisting of stain remover, perfume, colorant, wetting agent, alkaline material, and bactericide.

References Cited

UNITED STATES PATENTS 3,189,554  6/1965  Dean _____ 252—181

FOREIGN PATENTS 665,457  1/1952  Great Britain.

HERBERT B. GUYNN, *Primary Examiner.*

J. GLUCK, *Assistant Examiner.*

U.S. Cl. X.R.

21—2.7; 210—58, 62; 252—87, 389